Aug. 3, 1965     J. G. E. COHN ETAL     3,197,955
PURIFICATION OF INTERNAL COMBUSTION ENGINE EXHAUST GAS
Filed Nov. 1, 1962
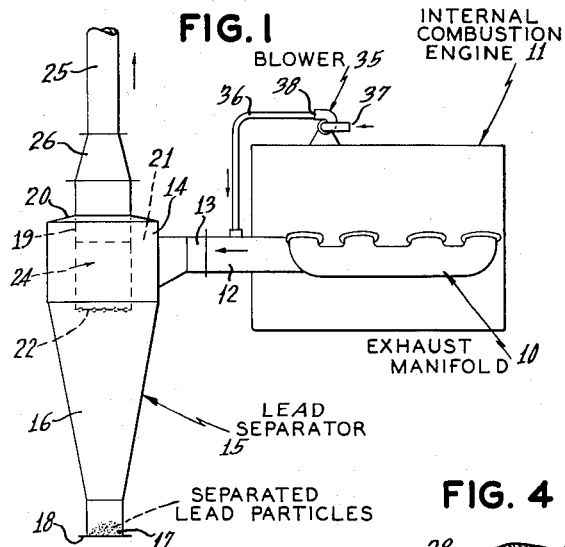
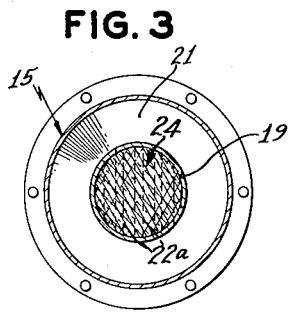
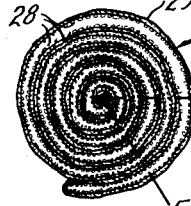
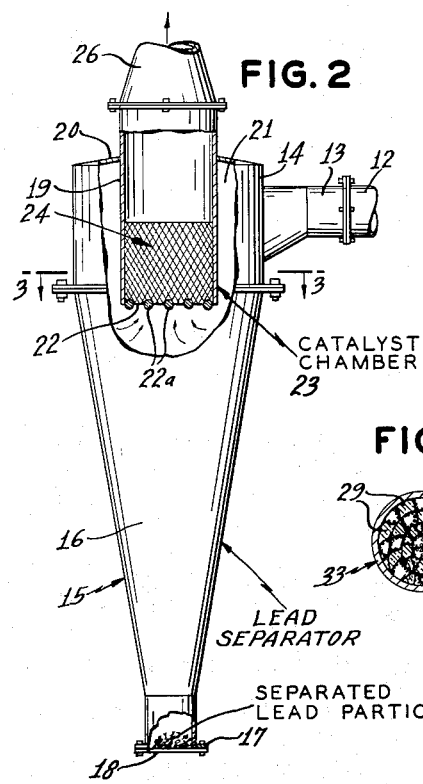
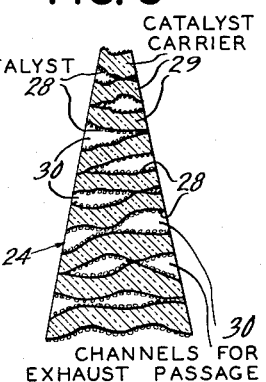
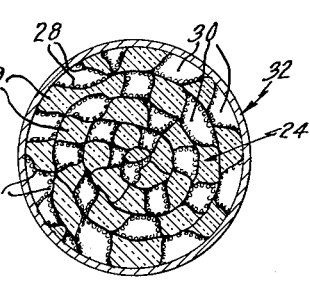
INVENTORS
JOHANN G. E. COHN
ANNA P. HAUEL
BY
ATTORNEY 3,197,955
PURIFICATION OF INTERNAL COMBUSTION ENGINE EXHAUST GAS
Johann G. E. Cohn and Anna P. Hauel, West Orange, N.J., assignors to Engelhard Industries, Inc., Newark, N.J., a corporation of Delaware
Filed Nov. 1, 1962, Ser. No. 234,725
5 Claims. (Cl. 60—30)

This invention relates to the purification of exhaust gas of internal combustion engines, and more particularly to a process and apparatus for the purification of exhaust gas of internal combustion engines adapted to operate on leaded fuel.

An important gas purification problem which has not been successfully solved is decontamination of automobile exhaust gas streams. According to the prevailing theory, smog is formed by the reaction of hydrocarbons, particularly unsaturated hydrocarbons, with oxides of $N_2$ and ozone in the presence of sunlight. Automobile exhaust contributes significant amounts of such smog-forming materials and, in Los Angeles and certain other areas afflicted with air temperature inversion conditions, automobile exhaust constitutes the most serious amount of air pollution. Legal requirements for purification of auto engine exhausts have been legislated in California, without as yet a satisfactory purification method demonstrated. Automobile exhaust streams also contain, in addition to the smog formers, such poisonous materials as particulate lead compounds resulting from gasoline which has been leaded up to the limit generally permitted by law, usually 3 cc. $Pb(C_2H_5)_4$ per gallon of gasoline, and carbon monoxide present in amounts up to 7 percent by volume.

One proposed method of purification of the exhaust is by catalytic oxidation using an oxidation catalyst, for instance a platinum group metal as catalyst. However, it was found that when burning leaded gasoline in the automobile engine with the gasoline leaded up to the limit generally permitted by law, the catalyst was usually deactivated after a non-lengthy period resulting in cessation of the purification of the exhaust gas. It was subsequently concluded that the deactivation of the catalyst was due to either deposition of the particles of lead compounds from the exhaust gas as a fine layer over the catalyst bed or poisoning of the catalyst by the lead compounds.

Further, oftentimes leaded gasolines are used because a consumer does not have ready access to unleaded gasolines, e.g., for gasoline engines for lawn mowers or for trucks operating in buildings, and an accumulation of Pb dust in buildings, play areas and storage spaces is undesirable. It would be advantageous in such cases to also prevent the exhaust of lead from such machines.

The paper "Particulate Lead Compounds in Automobile Exhaust Gas" by D. A. Hirschler, L. F. Gilbert, F. W. Lamb, and L. M. Niebylski of the Ethyl Corporation, in Industrial and Engineering Chemistry for July 1957, furnishes a thorough study of the nature of Pb compounds deposited in the exhaust system or expelled to the atmosphere. The paper reports chief exhaust system deposits as $PbCl \cdot Br$ and $PbO \cdot PbCl \cdot Br \cdot H_2O$. Chief forms of Pb exhausted to the atmosphere were found to be $PbCl \cdot Br$, alpha and beta forms of $NH_4Cl \cdot 2PbCl \cdot Br$, and $$2NH_4Cl \cdot PbCl \cdot Br$$

It was noted that considerable amounts of Pb compounds previously deposited in the exhaust system were vented to the atmosphere at times of high speed driving—this presumably resulting from the increased velocity of the exhaust gas and increased heating of the exhaust system. In addition to dependence on driving speed, the amount of lead exhausted was proportional to the concentration of lead in the gasoline. However, particle size distribution and composition were independent of the concentration of Pb in gasoline.

It is an object of this invention to provide for eliminating or reducing the amount of particulate lead in automobile exhaust gas streams in the purification of such exhaust streams before the streams are contacted with an oxidation catalyst so that the catalyst is not deactivated by such particulate lead.

Another object of this invention is to prevent the pollution of the atmosphere by particulate lead heretofore emitted into the atmosphere in internal combustion engine exhaust gases.

Another object of this invention is to prevent the emission into the atmosphere of harmful quantities of nocuous hydrocarbons and carbon monoxide in exhaust gases of internal combustion engines.

Additional objects and advantages will be readily apparent as the invention is hereafter described in more detail.

The terms "particulate lead" and "lead particles" used hereinafter and in the appended claims are used in a broad sense to include particles of metallic lead and lead compounds including $PbCl_2$, $PbBr_2$, $PbClBr$, $$PbO \cdot PbCl \cdot Br \cdot H_2O$$

alpha and beta forms of $NH_4Cl \cdot 2PbCl \cdot Br$ $$2NH_4Cl \cdot PbCl \cdot Br$$

and other lead compounds that may be present in the exhaust gas, as well as any lead oxide particles that might be present. Exhausted particles range typically from less than a micron to several millimeters in diameter.

In accordance with the present invention, it was found that the deleterious or noxious unburned or partially burned constituents of the fuel, for instance saturated and unsaturated hydrocarbons and CO, can be catalytically removed from the exhaust gas of internal combustion engines operating on leaded gasoline fuel and hence also containing the particulate lead compounds without deactivation of the oxidation catalyst and without premature cessation of the purification, by mechanically separating the particulate lead from the exhaust gas prior to contacting the catalyst with the gas. The lead particles are preferably separated from the exhaust gas by passing the exhaust gas into an enclosed separation zone, such as a cyclone separator, and forcing the gas stream to take a circular path at high velocity therewithin whereby the resultant forces cause the lead particles to be thrown out of the gas. The exhaust gas of reduced lead content and containing molecular oxygen in amount sufficient to oxidize the noxious constituents present therein, is then passed into contact with the oxidation catalyst, preferably a platinum group metal catalyst to effect the removal of the noxious constituents. The exhaust gas, free or substantially free of noxious smog formers and poisonous materials is then discharged harmlessly to the atmosphere.

It is emphasized that the separation of the particulate lead from the exhaust gas of the present invention is a mechanical separation as contrasted with a chemical separation of the lead. The cyclonic separation of the lead particles from the exhaust gas is preferred over the use of a filter for the separation, as the cyclonic separation does not add substantially to the back pressure of the exhaust system, and does not restrict or slow down the passing of the exhaust gas.

It is preferred that the catalyst be disposed in the cyclone separator discharge conduit so that the sensible heat of the unpurified exhaust gas being emitted from the manifold, which heat was previously wasted, be utilized in preheating the catalyst to the reaction temperature. As a result, the oxidation catalyst is at a reaction temperature when the gas exhaust, free of lead or of materially reduced lead content, is contacted with the catalyst.

If necessary, to maintain the catalyst at a reaction temperature, the exhaust gas or the oxidation catalyst may be heated, for instance by electrical heating means, e.g. resistance wire wound around the exhaust pipe prior to the cyclone, or resistance wire wound around the cyclone gas discharge conduit containing the catalyst. Also the cyclone may be covered with thermal insulation for purpose of retaining the heat in the oxidation catalyst and to prevent radiation heat loss to areas where it would be undesirable. Reaction temperatures of the catalyst of preferably about 350°–700° C. are employed.

The oxidation catalyst can also be positioned or disposed in the exhaust line or muffler downstream of the separator instead of in the separator. The oxidation catalyst may be inserted in the form of pellets, spheres or granules but preferably is inserted as an easily removable and replaceable cartridge or form wherein the catalytic metal may be supported on a glass fiber fabric which is rolled up on itself as a gas-pervious roll or cylindrical spiral. Such roll or cylindrical spiral is described in U.S. patent application Serial No. 72,842, filed December 1, 1960.

Any suitable oxidation catalyst can be used herein. Platinum group metals are preferred oxidation catalysts, and palladium, platinum, and rhodium are preferred among the platinum group metals. Silver or copper can also be used as the oxidation catalyst. The catalytically active material is supported on a carrier which may be of any refractory material such as glass fiber, wire screen, alumina, alumina-silica, asbestos, etc. and combinations thereof. A preferred type of carrier is wire or glass fibers coated with a refractory oxide, such as alumina, alumina-silica, alumina-thoria and alumina-chromia. Such preferred coated wire or fibrous material is advantageously rolled to form a gas-pervious removable and replaceable cartridge. The supported catalyst can be prepared in any conventional and well-known manner, for intance by impregnating the carrier or support with a solution of a compound of the metal, and then reducing the metal.

Inasmuch as the internal combustion engine exhaust gas stream generally contains more unburned hydrocarbons than the equivalent of $O_2$ present therein, supplementary air, which may be heated, is preferably added to the exhaust line prior to the separator to provide an amount of $O_2$ therein in excess of that stoichiometrically required for complete reaction with the unburned hydrocarbons and carbon monoxide to form $CO_2$ and water. Air may be introduced into the exhaust gas mixture, for instance by means of a feed conduit communicating with a blower or compressor, or by other suitable means.

The importance of preventing the lead particles from contacting the catalysts of this invention is illustrated by the following examples I and II.

*Example I*

Catalytic purification of auto engine exhaust was studied using equipment hereafter described.

A 1954 chassis mounted V8 Ford engine was connected to a water-sealed vacuum pump which served as load. The pump required 25–30 H.P. depending on r.p.m. At an engine speed corresponding to 50 m.p.h. the load on the pump equals the load required for keeping an ordinary automobile in motion at this speed.

Two carburetors were mounted interchangeably to yield, at constant r.p.m., either rich or lean air-fuel ratios and corresponding exhaust gases high or low in residual combustibles (CO levels at 1,000 r.p.m. from 0.1 percent to 5 percent). Several interchangeable mufflers were designed to hold the catalyst beds. Upstream of the catalyst bed supplementary air was added from a compressor in order to supply the oxygen required for the combustion of the organics and the CO of the primary exhaust. Temperatures ahead of the catalyst and within the catalyst bed and after the catalyst bed were recorded by a 6 point temperature recorder which permitted following the performance of the catalyst and obtaining information on the type of primary exhaust generated. Also, on starting up the cold engine the so-called "take off" time of the catalyst was automatically recorded.

The gasoline consumption in cc./minute was measured at different engine speeds. This gasoline consumption, together with gas analysis, allowed computation of approximate exhaust space velocities in the catalyst bed. Gas samples were drawn before and after the catalyst bed.

Usual operation of the engine was carried out in accordance with the following program:

8 a.m.

Start of engine.
Idle (No load)—450 r.p.m. 30 seconds
Drive Gear—600 r.p.m. 30 seconds
Accelerated to 1,000 r.p.m. (22 m.p.h.) and left at this speed. Catalyst usually ignited within 2 minutes, frequently faster. Engine operated at 1,000 r.p.m. during the day. Gas samples taken during this period.
Overnight or weekends: Engine operated at 1,000 r.p.m. (22 m.p.h.) or 1,500 r.p.m. (35 m.p.h.).

5 a.m.

Engine turned off. Continued secondary air through catalyst bed to insure cooling of catalyst to room temperature prior to restart at 8 a.m.

Catalyst performance was checked by conventional gas analysis as well as by infrared analysis with a Perkin-Elmer Model 21 spectrograph using a 1-meter cell. Infrared analysis was made in accordance with the procedure disclosed in Air Pollution Foundation Report No. 8, p. 56 ff. The gases determined were CO, $CH_4$, saturated hydrocarbons having 3 to 8 carbon atoms, $C_2H_4$ and $C_2H_2$. Conversion of $CH_4$ and of saturated hydrocarbons is considered to be of subordinate significance. Important from the air pollution standpoint is the removal of CO and of unsaturated hydrocarbons.

Catalyst activity was also checked before and after or during a run in a separate bench reactor using a synthetic gas simulating a lean oxidizing engine exhaust, viz:

| Percent: | (By volume) |
|---|---|
| 0.1 | CO |
| 0.05 | $C_2H_4$ |
| 0.05 | $C_3H_8$ |
| 3 | $O_2$ |
| 12 | $CO_2$ |
| Balance | $N_2$ |

The composition of the gas mix was low enough in combustibles to insure practically isothermal reaction in the test. The catalysts were evaluated by determinating the minimum gas temperature needed to convert 80 percent of the respective combustibles. Conversion was measured by infrared analysis of down stream gas samples.

Catalyst exhaust purification was performed with a variety of catalysts. Except for inactivation due to lead, either by poisoning or physical covering of the active metal surface, Pt group metals were found superior catalysts for such purifications. The metals Pd, Pt, and Rh dispersed on carriers, such as alumina pellets, and alumina-silica spheres, gave sufficient purification and could be used when a catalyst bed of sufficient cross section was designed to prevent excessive back pressure in the auto exhaust system.

*Example II*

(A) A catalyst containing 4.58 gms. of Pd dispersed on a coated glass fiber fabric was rolled on itself into a cylindrical spiral or cartridge with a volume of 925 ml. and placed in the exhaust line of the Ford engine of Example I. The engine was operated at 1,000 r.p.m. with Esso Regular gasoline containing 2.8 ml. lead tetraethyl or 3 gms. of lead per gallon. The catalytic efficiency for removing $C_2H_4$ and CO from the exhaust was determined after 600, 800 and 1100 equivalent driving miles. $C_2H_4$ combustion after 600 miles was 90 percent, after 800 miles 50 percent, and after 1100 miles about 0 percent. The CO combustion after 600 miles was 90 percent, after 800 miles 80 percent, and after 1100 miles 50 percent. Thus, when exposed to leaded gasoline this catalyst had an excessively short life.

(B) A similar catalyst containing 3.86 gms. of Pd dispersed on the coated glass fabric was wound into a cylindrical spiral or cartridge with a volume of 925 ml. and placed in the engine exhaust line. This catalyst was tested under similar conditions with Amoco Premium gasoline which was determined spectrographically to contain only 0.18 ml. per gallon of lead tetraethyl or about 0.2 gm. of lead per gallon. With this gasoline—catalyst combination $C_2H_4$ combustion was still 100 percent after 4000 equivalent driving miles, had dropped to about 90 percent after 7000 miles, and after 10,000 miles remained about 70 percent. CO combustion was 100 percent up to 2500 miles and remained 95 percent to 10,000 miles. The long life of the catalyst when used with the Amoco gasoline is also evidenced by the low ignition temperatures and fast ignition start-up over the period of this 10,000 mile operation. Throughout this period the catalyst ignited the exhaust stream within three minutes of start of the cold engine and prior to heating of the catalyst up to 300° C.

This comparison and other similar tests demonstrate clearly the importance for long life of catalyst of preventing the lead particles from reaching the catalyst, where Pt group metal catalysts are used for oxidation of combustibles in automobile engine exhaust.

The following example illustrates lead removal from auto engine exhaust gas by a cyclone separator prior to contacting the exhaust gases with a catalyst.

*Example III*

The dimensions of the cyclone separator used were a a diameter of 8½" at the top with a cylindrical section 5" high. Below the 5" section was a conical portion 15" in height tapering to a removable bottom for collecting the separated lead particles. A gas discharge conduit 4" in diameter extended axially downwardly 6" in the upper portion of the cyclone cylindrical section, and a catalyst bed of 1250 gms. of rhodium on alumina was provided in the lower portion of this gas discharge conduit. The catalyst consisted of 0.5 percent Rh on ⅛" x ⅛" cylindrical $Al_2O_3$ pellets.

The cyclone was connected into the automobile exhaust pipe in a manner such that the exhaust gas passed into the cyclone tangentially through a 2" diameter inlet pipe at the top, whereby the heavy lead particles were spun around and collected at the bottom of the cylone. The exhaust gases of reduced lead content then moved upwardly into the discharge conduit and into contact with the rhodium on alumina catalyst bed therein. The 1954 V8 chassis mounted Ford engine was used and the engine was operated the equivalent of 57 hours at an average speed of 25 miles per hour, a total of 1430 miles. Esso Regular gasoline containing 2.8 ml. lead tetraethyl per gallon was burned in the engine. Supplementary air was added. After completing the engine run, the cyclone unit was disconnected from the exhaust pipe and the lead dust which was collected at the bottom of the unit was removed, weighed and analyzed. 48.5 gms. of dust was collected in the cyclone. On analyzing this dust it was found that it contained 58 percent of lead, which means that 28 gms. of lead were collected in the cyclone bottom. The balance of the dust was mainly chlorine and bromine.

As a result of the lead particles being prevented from reaching the catalyst, the catalyst was not deactivated during the purification and the removal of the deleterious unburned or partially burned fuel from the exhaust gases was achieved prior to their introduction into the atmosphere.

In the drawings:

FIGURE 1 is a side elevational view showing apparatus of this invention for the catalytic purification of internal combustion engine exhaust gas without deactivation of the catalyst;

FIGURE 2 is an enlarged side elevational view partially in section of the lead separator of the apparatus of this invention, the separator being disconnected from the auto exhaust pipe;

FIGURE 3 is a section taken on line 3—3 of FIGURE 2;

FIGURE 4 is a transverse section through a cylindrical spiral cartridge of this invention which is the preferred supported catalyst;

FIGURE 5 is an enlarged section taken on lines 5—5 of FIGURE 4;

FIGURE 6 is a transverse section through a muffler in a modification of the apparatus of this invention, the muffler containing a preferred supported catalyst of the invention; and FIGURE 7 is a transverse section through a tail pipe in another modification of the apparatus of this invention, the tail pipe containing the preferred supported catalyst of the invention.

Referring to FIGURE 1, exhaust manifold 10 of internal combustion engine 11 of an automobile is connected by exhaust pipe 12 through a flanged connection to inlet pipe 13 communicating with cylindrically walled upper portion 14 of cyclone separator 15. Engine 11 is a spark-ignition reciprocating internal combustion engine adapted to operate on leaded gasoline fuel. Blower 35 mounted and secured onto the engine my any suitable securing means known to the art, is provided for supplying air to pipe 12 through feed conduit 36. Inlet pipe 13 is so arranged and disposed in upper portion 14 of the cyclone separator as to discharge the exhaust gases tangentially or peripherally therein. Cyclone separator 15, shown also in FIGURES 2 and 3, preferably has conical lower portion 16 which terminates in flanged discharge outlet 17 having end plate 18 removably secured to the flange by suitable fastening means, for instance bolts. Discharge conduit 19 for exhaust gas intersects end plate 20 at the upper portion of the separator and extends axially downwardly therewithin and terminates in discharge outlet 22 for exhaust gas which has been freed of all or substantially all of its lead particles. Discharge conduit 19 is spaced from cylindrically walled upper portion 14 and cooperates therewith to define annular space 21 therebetween.

Catalyst chamber 23, provided by the lower end portion of discharge conduit 19, has inserted therewithin a gas-pervious catalyst cartridge 24 comprising the platinum group metal catalyst supported on a gas-pervious glass fiber fabric which is rolled up on itself in the form of a roll or cylindrical spiral. This glass fabric roll supporting the catalyst is the removable and replaceable cartridge previously disclosed herein. This fiber glass fabric roll or cylindrical spiral is shown in more detail in FIGURES 4 and 5, with the particles 28 of catalytic metal deposited on the glass fabric 29. The glass fabric of the roll is of a corrugated nature as shown whereby channels 30, shown in FIGURE 5 are provided which facilitate the passage of the gas therethrough. Alternatively, the glass fiber fabric can be in the form of a tube having a central gas passageway and having catalytically active metal deposited thereon. The catalyst could be supported on other carriers and in the shapes or forms previously discussed. Spaced rods 22a extend over outlet 22 of discharge conduit 19 and are secured thereto for retaining the catalyst cartridge in conduit 19.

In the modification of FIGURE 6, the roll or cylindrical spiral of glass fabric 29 supporting the particles 28 of catalytic metal and having channels 30 for passage of the exhaust gas is disposed in a muffler 32 connected in the tail pipe downstream of the separator means for removing the particulate lead. In another modification shown in FIGURE 7, the glass fabric roll or cylindrical spiral supporting the catalytic metal is located in the tail pipe 33 downstream from the particulate lead separator means and also downstream from the muffler. Alternatively, this glass fabric catalytic roll or spiral could be disposed in the tail pipe 33 intermediate the lead separator means and the muffler. Retaining means such as for instance narrowly spaced rods extending across the inside of the pipe and secured to the inner surface of the pipe walls can be used.

Referring again to FIGURE 1, discharge conduit 19 is connected to tail pipe or exhaust gas line 25 through intermediate connecting conduit 26 by flanged connections, tail pipe 25 ultimately discharging to the atmosphere the purified exhaust gases free or substantially free of the unburned or partially burned fractions of the fuel, i.e. smog formers and deleterious materials. With the exception of the supported catalyst, the apparatus is constructed of ferrous metal.

In operation, exhaust gas containing the unburned hydrocarbons and carbon monoxide as well as the lead particles suspended therein is forced from the cylinders of internal combustion engine 11, collected by manifold 10 and passed at high velocity via exhaust pipe 12 to inlet conduit 13 of cyclone separator 15. Air is added to the exhaust gas in pipe 12 through supply conduit 36 equipped with blower 35, the air entering blower 35 through its inlet 37 and being passed through blower outlet 38 via conduit 36 into admixture with the exhaust gas in pipe 12 in amount sufficient to provide a quantity of oxygen in excess of that stoichiometrically required to oxidize the noxious carbon monoxide and hydrocarbons therein to innocuous or harmless carbon dioxide and water. The gas is introduced tangentially within cylindrical upper portion 14 of separator 15, wherein it is forced to follow a circumferential paths at high velocity in annular space 21 (between discharge conduit 19 and the wall of upper portion 14). The centrifugal force causes the lead particles to strike against the wall of the container, wherefrom the lead particles gravitate to the bottom of cyclone separator 15 where they are periodically removed from the cyclone by removal of end plate 18. The hot exhaust gas free or substantially free of particulate lead passes upwardly and into outlet 22 of discharge conduit 19. The gas contacts the catalyst 24 as it passes upwardly through discharge conduit 19, whereby all or substantially all of the unburned hydrocarbons are removed from the gas by being oxidized to innocuous $CO_2$ and $H_2O$. Further, all or substantially all of the poisonous carbon monoxide is removed from the gas by being oxidized to $CO_2$. The exhaust gas then passes through intermediate connecting conduit 26 to exhaust pipe 25 for ultimate discharge into the atmosphere. In the embodiments of FIGURES 6 and 7, the hot gas free or substantially free of the lead contacts the catalyst in the muffler 32 or tail pipe 33 respectively whereby the deleterious unburned hydrocarbons and carbon monoxide are oxidized to harmless carbon dioxide and water.

It will be obvious to those skilled in the art that many modifications may be made within the scope of the present invention without departing from the spirit thereof, and the invention includes all such modifications.

What is claimed is:

1. In combination with an internal combustion engine operable on leaded fuel,
   (a) an exhaust gas conduit for conducting engine exhaust gas containing particulate lead from the internal combustion engine to an inlet means of a cyclone separator hereafter specified;
   (b) the cyclone separator, said separator including the exhaust gas inlet means for introducing exhaust gas tangentially into the separator in an upper portion thereof, and gas discharge conduit means for removal of exhaust gas of reduced particulate lead content from said separator, said discharge conduit means intersecting an upper end wall of the separator and extending axially linearly downwardly therewithin an appreciable distance to terminate in a gas discharge outlet therein at a level of the separator below that of the gas inlet means;
   (c) solid particulate lead collector means communicating with a lower end portion of the cyclone separator for receiving by gravitational flow the solid lead particles separated from the exhaust gas in the separator;
   (d) a gas-pervious mass of an oxidation catalyst susceptible to premature deactivation by particulate lead disposed within a lower end portion of the exhaust gas discharge conduit extending within and surrounded by said separator;
   (e) means for retaining the catalyst gas-pervious mass within said gas discharge conduit end portion while permitting free flow of the gas of reduced lead content thereinto; and
   (f) means for removing the collected solid particles from the collector means.

2. In combination with an internal combustion engine operable on leaded fuel,
   (a) an exhaust gas conduit for conducting exhaust gas containing particulate lead from the internal combustion engine to an inlet means of a cyclone separator hereafter specified;
   (b) the cyclone separator, said separator comprising a cylindrically walled upper portion, a truncated inverted conically-shaped lower portion, the exhaust gas inlet means in the cylindrically walled upper portion adjacent an upper end wall thereof for introducing exhaust gas tangentially into the separator, and a gas discharge conduit for removal of exhaust gas of reduced particulate lead content from the separator, said gas discharge conduit intersecting the upper end wall of the separator and extending an appreciable distance axially linearly downwardly therewithin to terminate in a gas discharge outlet therein at a level of the separator substantially below that of the gas inlet means;
   (c) solid particulate lead collector means communicating with a lower end portion of the cyclone separator for receiving by gravitational flow the solid lead particles separated from the exhaust gas in the cyclone separator;
   (d) a gas-pervious mass of an oxidation catalyst susceptible to premature deactivation by particulate lead disposed within a lower portion of the exhaust gas discharge conduit extending within and surrounded by said separator, whereby the oxidation catalyst is at an elevated reaction temperature at the time of contact with the exhaust gas of reduced particulate lead content due to the sensible heat of the exhaust gas introduced into the separator preheating said catalyst mass to the reaction temperature;
   (e) means for retaining the catalyst gas-pervious mass within said gas discharge conduit end portion while permitting free flow of the gas of reduced particulate lead content thereinto;
   (f) means for supplying an oxygen-containing gas to the exhaust gas conduit at a point thereof intermediate the engine and the separator means; and
   (g) means for removing the collected particulate lead particles from the collecting means.

3. The apparatus according to claim 1 wherein the oxidation catalyst is a platinum group metal.

4. The apparatus according to claim 3 wherein the platinum group metal is supported on a carrier comprising a gas-pervious glass fiber fabric rolled up on itself forming a readily replaceable gas-pervious catalyst cartridge.

5. The apparatus according to claim 2 wherein the oxygen-containing gas supply means comprises a blower including a blower inlet communicating with the atmosphere and a blower outlet, and a conduit interconnecting the blower outlet and the exhaust gas conduit.

References Cited by the Examiner
UNITED STATES PATENTS

| | | | |
|---|---|---|---|
| 1,716,480 | 6/29 | Bilsky | 60—29 X |
| 1,841,556 | 1/32 | Stelz | 55—459 X |
| 3,013,628 | 12/61 | Jacobs et al. | 23—288.3 X |
| 3,032,967 | 5/62 | Dosie | 60—30 |
| 3,056,662 | 10/62 | Ridgway | 60—30 X |
| 3,061,416 | 10/62 | Kazokas | 60—30 X |

JULIUS E. WEST, *Primary Examiner.*